United States Patent
Chambliss et al.

(10) Patent No.: US 7,550,198 B2
(45) Date of Patent: *Jun. 23, 2009

(54) MULTILAYER SEALABLE FILM HAVING A TEMPERATURE-RESISTANT LAYER THEREIN

(75) Inventors: Robert E Chambliss, Trussville, AL (US); Paul Z Wolak, Indianapolis, IN (US)

(73) Assignee: Pliant Corporation, Schaumburg, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/873,162

(22) Filed: Oct. 16, 2007

(65) Prior Publication Data

US 2008/0113131 A1 May 15, 2008

Related U.S. Application Data

(63) Continuation of application No. 11/119,672, filed on May 2, 2005, now Pat. No. 7,282,258.

(51) Int. Cl.
*B32B 27/08* (2006.01)
*B32B 27/30* (2006.01)
*B32B 27/32* (2006.01)

(52) U.S. Cl. .............. 428/349; 428/220; 428/336; 428/515; 428/516; 428/520

(58) Field of Classification Search ........... 428/220, 428/336, 349, 515, 516, 520
See application file for complete search history.

(56) References Cited

U.S. PATENT DOCUMENTS

| | | | |
|---|---|---|---|
| 3,673,050 A | 6/1972 | Newmann et al. | |
| 4,661,414 A | 4/1987 | Kowalski | |
| 4,677,017 A | 6/1987 | DeAntonis et al. | |
| 4,828,928 A | 5/1989 | Shah | |
| 4,891,253 A | 1/1990 | Mueller | |
| 4,916,025 A | 4/1990 | Lu | |
| 5,075,143 A | 12/1991 | Bekele | |
| 5,139,878 A | 8/1992 | Kim et al. | |
| 5,221,570 A | 6/1993 | Gokcen et al. | |
| 5,500,265 A | 3/1996 | Ambroise et al. | |
| 5,858,552 A | 1/1999 | Bader et al. | |
| 6,326,068 B1 | 12/2001 | Kong et al. | |
| 6,770,361 B2 | 8/2004 | Kong | |
| 7,282,258 B2 * | 10/2007 | Chambliss et al. | .......... 428/220 |
| 2003/0211350 A1 | 11/2003 | Migliorini | |
| 2004/0023054 A1 | 2/2004 | Wolak | |
| 2004/0115457 A1 | 6/2004 | Kong | |

FOREIGN PATENT DOCUMENTS

| | | |
|---|---|---|
| WO | WO-94/01469 A | 1/1994 |
| WO | WO-02/06048 A | 1/2002 |

OTHER PUBLICATIONS

PCT International Search Report of International Application No. PCT/US2006/011941, Aug. 8, 2006.*
PCT Written Opinion of the International Searching Authority of International Application No. PCT/US2006/011941, Aug. 8, 2006.*

* cited by examiner

*Primary Examiner*—D. S Nakarani
(74) *Attorney, Agent, or Firm*—McAndrews, Held & Malloy, Ltd.

(57) ABSTRACT

The present invention provides a multilayer sealable film having a sealable outer layer, a first heat resistant layer, a core layer, and a second heat resistant layer. In a preferred embodiment of the present invention, the core layer is positioned between the two heat resistant layers. The sealable layer is positioned such that one of the heat resistant layers is located between the seal layer and the core layers.

18 Claims, No Drawings

MULTILAYER SEALABLE FILM HAVING A TEMPERATURE-RESISTANT LAYER THEREIN

CROSS-REFERENCE TO RELATED APPLICATIONS

This application is a continuation of U.S. application Ser. No. 11/119,672, filed May 2, 2005. The above-identified application is incorporated herein by reference in its entirety.

STATEMENT REGARDING FEDERALLY SPONSORED RESEARCH OR DEVELOPMENT

Not applicable.

BACKGROUND OF THE INVENTION

The present invention relates generally to a multilayer film structure that is both sealable and peelable, and more specifically to a multilayer film having a heat-resistant layer located between the seal and core layers thereof.

Sealable film structures are known in the art. U.S. Pat. No. 5,500,265, for example, discloses a peelable film having a core layer comprising a olefin polymer, and a skin layer on at least one surface of the core layer. The skin layer comprises a blend of butylene polymer with another olefin polymer or a polymer of butylene and at least one other olefin. Also disclosed is a coating layer on the film.

U.S. Pat. No. 6,770,361 discloses a sealable and peelable film structure having a core layer, and a pair of outer layers, at least one of which is sealable. The core layer disclosed comprises a peelable blend comprising from 20%-80%, by weight, of a polyethylene and from 80%-20%, by weight, of a polyolefin incompatible with the polyethylene. The outer layers are comprised of thermoplastic polymers.

There remain, however, needs to be met in the field of sealable, peelable film structures. It occurs, on occasion, that the machinery used in the packaging and sealing of products commonly provided in sealed, peelable packaging will displace the seal layer of a multilayer film during the manufacturing process. In addition, even if the seal layer is not displaced, the machinery may otherwise disrupt the integrity of the seal layer. In either case, a layer separate from the seal layer is exposed when the package is sealed and the seal layer is sealed to that other layer. Alternatively, two non-seal layers may be inadvertently sealed to one another. In any event, the desired peel seal is not obtained and a consumer using the product will be unable to open the package as intended by the manufacturer. Instead, the separation or "tear" spreads to other layers of the multilayer film, resulting in what is known as a z-direction tear. Z-direction tears render a package more difficult to close properly, if the package is closeable at all, thereby limiting the freshness lifespan of the product contained therein. Eliminating z-direction tearing allows packages to be opened properly and, therefore, closed properly.

What is needed, therefore, is a film that reduces or eliminates inadvertent sealing of other than the seal layer(s).

BRIEF SUMMARY OF THE INVENTION

The present invention provides a multilayer sealable film having a sealable outer layer, a first heat resistant layer, a core layer, and a second heat resistant layer. In one aspect of the present invention, the core layer is positioned between the two heat resistant layers. The sealable layer is positioned such that one of the heat resistant layers is located between the seal layer and the core layers.

In one aspect of the present invention, the sealable outer layer includes at least one ethylene-methacrylic acid copolymer, the heat resistant layers include at least one heat-resistant polyolefin polymer, and the core layer includes at least one polyolefin polymer.

In another aspect of the present invention, the film is provided as a five-layer film having two core layers contained therein and adjacent to one another. The core layers are flanked by first and second heat-resistant layers. One aspect of the two core layer film of the present invention includes linear medium-density polyethylene and linear low-density polyethylene as components of both core layers, with the respective amounts of the two polymers differing between the two layers.

DETAILED DESCRIPTION OF THE INVENTION

The multilayer film of the present invention has a structure that includes a sealable outer layer, at least one heat resistant layer, and a core layer. In a preferred embodiment, the present film includes first and second heat-resistant layers, with the core layer positioned between the two heat-resistant layers. In each of the various embodiments described herein, the core layer is positioned with respect to the other layers such that, during heat-sealing of a package constructed from the film, the core layer will not be sealed to itself or to another layer. A preferred film of the present invention has a thickness of from about 1.5 mils to about 2.0 mils, and more preferably of about 1.75 mils. It is further preferred that the seal layer of the present film include both slip and anti-blocking additives.

More preferably, the seal layer is comprised of three separate polymers that are blended to form the layer. In such an embodiment of the present film, the seal layer preferably includes about 66% by weight of an ethylene-methacrylic acid copolymer ionomer having a partial zinc salt, about 30% by weight of an ethylene-methacrylic acid copolymer ionomer having a partial sodium salt, and about 4% by weight of an ethylene-methacrylic acid carrier resin having about 10% slip additive and 5% anti-blocking additive contained therein. A preferred ethylene-methacrylic acid copolymer ionomer having a partial zinc salt is Surlyn® 1825. A preferred ethylene-methacrylic acid copolymer ionomer having a partial sodium salt is Surlyn® 1601-2. A preferred ethylene-methacrylic acid carrier resin having slip and anti-blocking additives contained therein is Conpol® 5B10S1.

The sealable outer layer of the present film preferably includes at least one ethylene-methacrylic acid copolymer. Suitable polymers include various Surlyn® and Conpol® polymers, available from Dupont (Wilmington, Del.), and combinations thereof. The sealable outer layer preferably makes up about 15%, by weight, of the total film. This layer preferably has a thickness of from about 0.255 mils to about 0.300 mils, and more preferably of about 0.263 mils. Though it is preferred that the Surlyn® and/or Conpol® polymers described above are used for this layer of the present film, it is contemplated that any suitable polymers may be used, including any of various polymers known in the art for use in forming a seal layer. Examples of suitable polymers include Itek ionomers, available from ExxonMobil.

The first heat-resistant layer of the present film preferably includes a heat-resistant polyolefin polmer, such as high-density polyethylene. A suitable polymer, for example, is MarFlex®, available from ChevronTexaco Corporation (San Ramon, Calif.). The first heat-resistant layer of the present film preferably has a thickness of from about 0.150 mils to about 0.300 mils, and more preferably of about 0.210 mils.

This layer preferably makes up 12%, by weight, of the total film. It is further preferred that the first heat-resistant layer of the present film have a melt index of about 1 and a resin density of about 0.963. Although the MarFlex® polymer described above is preferred in the construction of the present film, it is contemplated that any suitable heat-resistant polyolefin or other polymer may be used. Examples of such other polymers include Alathon® high density polyethylene, available from Equistar Chemical (Houston, Tex.), and Inspire® polypropylene, available from The Dow Chemical Company (Midland, Mich.).

The core layer of the present film preferably includes at least one polyolefin polymer, and more preferably includes a combination of linear medium density polyethylene and linear low density polyethylene. Preferred polymers include Dowlex® linear medium density polyethylene, available from The Dow Chemical Company (Midland, Mich.), and Exceed® linear low density polyethylene, available from Exxon Mobil Chemical (Houston, Tex.). It is preferred that the core layer of the present invention have a thickness of from about 0.615 mils to about 1.00 mils, and more preferably of about 0.718 mils. It is further preferred that the core layer of the present film have a melt index of about 1 and make up about 41%, by weight, of the total film. The linear medium density polyethylene of the core layer preferably makes up about 60% of the core layer and has a resin density of about 0.935. The linear low density polyethylene of the core layer preferably makes up about 40% of the core layer and has a resin density of about 0.917. Though the Dowlex® and Exceed® polymers described above are preferred in the construction of the present film, any suitable polyolefin polymers may be used. Examples of other suitable polymers include Elite® linear low density polyethylene, available from The Dow Chemical Company, and Escorene® linear medium density polyethylene, available from ExxonMobil.

The second heat-resistant layer of the present film is preferably constructed from a heat-resistant polyolefin polymer, and more preferably from a combination of high density polyethylene and linear low density polyethylene. A suitable high density polyethylene polymer is MarFlex®, as described above, and a suitable linear low density polyethylene is Exceed®, also as described above. The second heat-resistant layer of the present film preferably has a thickness of from about 0.375 mils to about 0.640 mils, and more preferably of about 0.560 mils. It is further preferred that the second heat-resistant layer have a melt index of about 1. In an embodiment having both HDPE and LLDPE in the second heat-resistant layer, it is preferred that the HDPE have a resin density of about 0.963 and that the LLDPE have a resin density of about 0.917. The second heat-resistant layer of the present film preferably makes up about 32%, by weight, of the entire film. Though the MarFlex® and Exceed® polymers described above are preferred in the construction of the present film, it is contemplated that any suitable heat-resistant polyolefin or other polymer may be used. Examples of suitable polymers include Alathon® high density polyethylene, available from Equistar Chemical, and Elite® linear low density polyethylene, available from The Dow Chemical Company.

The multilayer film of the present invention may be produced by conventional methods used in producing multilayer films, including coextrusion and extrusion lamination techniques. For example, the film may be formed by coextrusion. Using this method, melted and plasticized streams of individual layer materials are fed into a coextrusion die. While in the die, the layers are juxtaposed and combined, after which they emerge from the die in a single multilayer film of polymeric material. Suitable coextrusion techniques are fully described in U.S. Pat. Nos. 5,139,878 and 4,677,017, incorporated herein by reference to the extent permitted by law. Coextrusion of the present film may be conducted at temperatures of from about 400° F. to about 510° F. Coextrusion techniques include the use of a feed block with a standard die, a multi-manifold die, such as a circular die, as well as a multi-manifold die such as used in forming flat cast films and cast sheets. The multilayer films of the present invention may also be made by blown film coextrusion. The film is formed using a blown film apparatus composed of a multi-manifold circular die head having concentric circular orifices. The multilayer film is formed by coextruding a molten layer through a circular die, and a molten layer on the other or each opposite side of the first layer through additional circular dies concentric with the first circular die. Next, a gas, typically air, is blown through a jet that is concentric with the circular dies, thereby forming a bubble that expands the individual layers. The bubble is collapsed onto itself to form a pair of multilayer films attached at two opposite edges. Usually, the pair of attached multilayer films are then cut apart at one or more of the edges and separated into a pair of multilayer films that can be rolled up. It is preferred that the films of the present invention are geared from a flat cast process. An example of the preferred process is provided below.

EXAMPLE 1

Method of Producing Films of the Present Invention

A preferred method for producing the films of the present invention is now described. As a first step, components are blended at a loss-in-weight blender and combined in the desired proportions, then sent to the feed portion of an extruder. This process allows for dry-blending of ingredients, thereby avoiding the need to utilize more expensive, fully compounded blends. Dedicated extruders mix, melt, and meter the components to a specific film layer. The various layers are extruded through a die slit, usually vertically, to form a thin-walled tube of polymer. Air is forced through a hole in the center of the die to blow up the tube of polymer like a balloon. The tube moves upward, cooling until it passes through nip rolls, where it is flattened to create a "lay-flat" tube of film. The lay-flat film is either kept as it is, or the edges are cut off to produce two flat film sheets that are then wound onto reels.

It will be appreciated by those skilled in the art that additives may be added to one or more layers of the film of the present invention in order to improve certain characteristics of the particular layer. Preferred additives include color concentrates, neutralizers, process aids, lubricants, stabilizers, hydrocarbon resins, antistatics, and antiblocking agents. A color concentrate may be added to yield a colored layer, an opaque layer, or a translucent layer. Preferred color concentrates include color formulations, including black, white, and other colors suitable for the film of the present invention. Preferred color concentrates include Ampacet® white PE masterbatch, available from Ampacet Corporation (Tarrytown, N.Y.). The carrier resin of Ampacet® white PE masterbatch is a LLDPE having a melt index of 20 g/10 min and a density of 0.92 g/cc. This concentrate has a nominal specific gravity of 2.06, a melt index of 3-23 g/10 min, and nominally contains 75% ash. Another preferred color concentrate includes Ampacet® white HDPE masterbatch, the carrier resin of which is a HD/LLDPE having a nominal melt index of 10 g/10 min and a density of 0.96 g/cc. This concentrate has a nominal specific gravity of 1.54, a melt index of 9-15 g/10 min, and a pigment composed of 50% $TiO_2$.

Suitable neutralizers include calcium carbonate, as indicated above, and calcium stearate. Preferred neutralizers have an absolute particle size of less than 10 μm and a specific surface area of at least 40 m$^2$/g. Polymeric processing aids may also be used in a layer. Fluoropolymers, fluoropolymer blends, and fluoroelastomers are particularly preferred, but any processing aid known in the art for use in polymer films is suitable. A particularly preferred processing aid is Ampacet® Process Aid PE masterbatch, having an LLDPE carrier resin with a nominal melt index of 2 g/10 min and a density of 0.918 g/cc. The concentrate therein has a nominal specific gravity of 0.91, a nominal melt index of 1-3 g/10 min, and contains 3% ash.

Lubricants that may be used in accordance with the present invention include higher aliphatic acid esters, higher aliphatic acid amides, metal soaps, polydimethylsiloxanes, and waxes. Conventional stabilizing compounds for polymers of ethylene, propylene, and other α-olefins are preferably employed in the present invention. In particular, alkali metal carbonates, alkaline earth metal carbonates, phenolic stabilizers, alkali metal stearates, and alkaline earth metal stearates are preferentially used as stabilizers for the composition of the present invention.

Hydrocarbon resins and, in particular, styrene resins, terpene resins, petroleum resins, and cyclopentadiene resins have been found to be suitable as additives in order to improve desirable physical properties of the film. These properties may include water vapor permeability, shrinkage, film rigidity, and optical properties. In particular, adhesive resins are preferred. A particularly preferred adhesive resin is sold under the trademark Bynel® by DuPont Corporation and is primarily composed of maleic anhydride modified polyolefin with some residual maleic anhydride and may also contain small amounts of stabilizers, additives and pigments.

Preferred antistatics include substantially straight-chain and saturated aliphatic, tertiary amines containing an aliphatic radical having 10-20 carbon atoms that are substituted by ω-hydroxy-($C_1$-$C_4$)-alkyl groups, and N,N-bis-(2-hydroxyethyl)alkylamines having 10-20 carbon atoms in the alkyl group. Other suitable antistatics include ethoxylated or propoxylated polydiorganosiloxanes such as polydialkysiloxanes and polyalkylphenylsiloxanes, and alkali metal alkanesulfonates.

Preferred antiblocking agents include organic polymers such as polyamides, polycarbonates, and polyesters. Other preferred agents include calcium carbonate, aluminum silicate, magnesium silicate, calcium phosphate, silicon dioxide, and diatomaceous earth.

In the preferred embodiments of the film of the present invention described hereinabove, the film structure is a four-layer structure. The four-layer structure allows for a core protected by two heat resistant layers, one positioned on either side of the core layer. An outer seal layer is provided so that the film can be used in practice to form packages and the like, thereby providing a layer that can be heat sealed to itself when the film is folded, for example, to produce a bag. The heat-resistant layers prevent tacking of the core layer and prevents the core layer from being sealed to itself or to another layer during the heat sealing process. In an alternative embodiment of the invention, the film may be provided as a five-layer film, having two adjacent core layers of the same composition, the core layers being flanked by the first and second heat-resistant layers.

The present invention is further illustrated by the following examples, which are not to be construed in any way as imposing limitations upon the scope thereof. On the contrary, it is to be clearly understood that various other embodiments, modifications, and equivalents which, after reading the description herein, may suggest themselves to those skilled in the art, may be used without departing from the spirit of the present invention and/or the scope of the appended claims.

EXAMPLES OF FILM STRUCTURES IN ACCORDANCE WITH THE PRESENT INVENTION

A four-layer film having a total thickness of about 1.75 mils was produced using the formula set forth in Table 1.

TABLE 1

Formulation A - 4 Layer Formulation

| Layer | Percent (w) of Film | Polymer |
|---|---|---|
| 1 (seal layer) | 15% | Ethylene/methacrylic acid copolymer, partial zinc salt ionomer - 66% (w) of layer Ethylene/methacrylic acid copolymer, partial sodium salt - 30% (w) of layer Ethylene/methacrylic acid carrier resin with 10% slip additive and 5% anti-blocking additive - 4% (w) of layer |
| 2 (heat-resistant layer) | 12% | High-density polyethylene |
| 3 (core layer) | 41% | Linear medium-density polyethylene - 60% (w) of layer Linear low-density polyethylene - 40% (w) of layer |
| 4 (heat-resistant layer) | 32% | High-density polyethylene - 89% (w) of layer Linear low-density polyethylene - 11% (w) of layer |

The specific products used in the manufacture of the Table 1 film are provided in Table 2, below.

TABLE 2

Formulation B - 4 Layer Formulation

| Layer | Percent (w) of Film | Polymer |
|---|---|---|
| 1 (seal layer) | 15% | Surlyn 1825 - 66% (w) of layer Surlyn 1601-2 - 30% (w) of layer Conpol 5B10S1 - 4% (w) of layer |
| 2 (heat-resistant layer) | 12% | MarFlex |
| 3 (core layer) | 41% | Dowlex - 60% (w) of layer Exceed - 40% (w) of layer |
| 4 (heat-resistant layer) | 32% | MarFlex - 89% (w) of layer Exceed - 11% (w) of layer |

A five-layer film having a total film thickness of about 1.75 mils was produced using the formula set forth in Table 3.

TABLE 3

Formulation C - 5 Layer Formulation

| Layer | Percent (w) of Film | Polymer |
|---|---|---|
| 1 (seal layer) | 15% | Ethylene/methacrylic acid copolymer, partial zinc salt ionomer - 66% (w) of layer<br>Ethylene/methacrylic acid copolymer, partial sodium salt - 30% (w) of layer<br>Ethylene/methacrylic acid carrier resin with 10% slip additive and 5% anti-blocking additive - 4% (w) of layer |
| 2 (heat-resistant layer) | 12% | High-density polyethylene |
| 3 (core layer) | 25% | Linear medium-density polyethylene - 60% (w) of layer<br>Linear low-density polyethylene - 40% (w) of layer |
| 4 (core layer) | 16% | Linear medium-density polyethylene - 89% (w) of layer<br>Linear low-density polyethylene - 11% (w) of layer |
| 5 (heat-resistant layer) | 32% | High-density polyethylene - 89% (w) of layer<br>Linear low-density polyethylene - 11% (w) of layer |

The specific polymers used in the five-layer formulation detailed in Table 3 are the same as those used in the four-layered formulation detailed in Table 2.

The film provided by the present invention may be tested for performance using either a hot seal or hot tack procedure, or by using both procedures. In each procedure, the film is placed on a flat surface, such as a surface of glass or the like. Then, strips of film at least 1×10 inches in size are cut in the machine direction. Generally, the sealing range of the film is known, but if it is not known, the strips of film can be sealed on a Sencorp sealer to determine a starting temperature.

The actual test is preferably controlled by computer software. The operator enters the necessary parameters into the computer. For a heat seal test, the standard conditions are generally as follows:

| | |
|---|---|
| Jaw Pressure: | 60 PSI |
| Dwell Time: | 1000 ms |
| Test Speed: | 30 cm/min |
| Air Cooling: | Medium |
| Cool Time: | 10,000 ms |
| Heater Control: | Top and bottom |

For a hot tack procedure, the standard conditions are generally as follows:

| | |
|---|---|
| Jaw Pressure: | 60 PSI |
| Dwell Time: | 1000 ms |
| Output Load: | @250 and 500 ms |
| Test Speed: | 200 cm/min |
| Temperature Increment: | 10 degrees F. |
| Air Cooling: | None |
| Heater Control: | Top and bottom |

These conditions may be varied as required by specific procedures.

Once the parameters above are entered into the computer, three strips of the film to be tested are placed within the sealer. The film is clamped into place, preferably with four positioning clamps. The top clamp is preferably clamped first, followed by the bottom clamp and then the two middle clamps. Once the film is clamped in place, the sealer is initiated with the computer software. After the test cycle is complete, the strips are removed from the tester. The testing is continued until at least two lockseals melt through, or until a predetermined temperature range is met.

The foregoing description of the embodiments of the invention has been presented for purposes of illustration and description, and is not intended to be exhaustive or to limit the invention to the precise form disclosed. The description was selected to best explain the principles of the invention and practical application of these principles in order to enable others skilled in the art to best utilize the invention in various embodiments and with such modifications as are suited to the particular use contemplated. It is intended that the scope of the invention not be limited by the specification, but be defined by the claims as set forth below.

The invention claimed is:

1. A multilayer film comprising:
   (a) a sealable outer layer comprising at least one ethylene-methacrylic acid copolymer;
   (b) a first heat-resistant layer comprising high density polyethylene or polypropylene;
   (c) a core layer comprising at least one polyolefin polymer; and
   (d) a second heat-resistant layer comprising high density polyethylene, wherein said core layer is positioned between said first and second heat-resistant layers, and further wherein said sealable outer layer is positioned such that said first heat-resistant layer is positioned between said sealable outer layer and said core layer.

2. The multilayer film of claim 1 wherein the sealable outer layer further comprises a zinc salt of an ethylene-methacrylic acid copolymer.

3. The multilayer film of claim 1 wherein said core layer comprises linear medium density polyethylene.

4. The multilayer film of claim 1 wherein said core layer comprises linear low density polyethylene.

5. The multilayer film of claim 1 wherein said second heat-resistant layer further comprises linear low density polyethylene.

6. The multilayer film of claim 1 wherein said sealable outer layer further comprises a sodium salt of an ethylene-methacrylic acid copolymer.

7. The multilayer film of claim 1 wherein the sealable outer layer further comprises a slip additive.

8. The multilayer film of claim 1 wherein said sealable outer layer further comprises an anti-blocking additive.

9. The multilayer film of claim 1 wherein said first heat-resistant layer comprises about 12%, by weight, of said multilayer film.

10. The multilayer film of claim 1 wherein said core layer comprises about 41%, by weight, of said multilayer film.

11. The multilayer film of claim 1 wherein said second heat-resistant layer comprises about 32%, by weight, of said multilayer film.

12. The multilayer film of claim 1, wherein the layers of the film are coextruded or extrusion laminated.

13. A multilayer film comprising:
- a sealable outer layer comprising at least one ethylene methacrylic acid copolymer;
- a first heat-resistant layer comprising high density polyethylene or polypropylene;
- a first core layer comprising at least one polyolefin polymer;
- a second core layer; and
- a second heat-resistant layer comprising high density polyethylene, wherein said first and second core layers are positioned between said first and second heat-resistant layers, and further wherein said sealable outer layer is positioned such that said first heat-resistant layer is positioned between said sealable outer layer and said first and second core layers.

14. The multilayer film of claim 13 wherein the first heat resistant layer comprises high density polyethylene.

15. The multilayer film of claim 13, wherein the second core layer comprises at least one polyolefin.

16. The multilayer film of claim 15, wherein the layers of the film are coextruded or extrusion laminated.

17. The multilayer film of claim 13, wherein the sealable outer layer comprises a sodium salt of an ethylene-methacrylic acid copolymer.

18. The multilayer film of claim 13, wherein the sealable outer layer comprises a zinc salt of an ethylene-methacrylic acid copolymer.

* * * * *